United States Patent
Adams-Campos et al.

(10) Patent No.: US 11,161,443 B2
(45) Date of Patent: Nov. 2, 2021

(54) GRAB HANDLE ASSEMBLY

(71) Applicant: Ford Global Technologies, LLC, Dearborn, MI (US)

(72) Inventors: Mario Alejandro Adams-Campos, Ferndale, MI (US); Eric Bryan Arellano Aguilar, Azcapotzalco (MX); Jay P. Miles, Whitmore Lake, MI (US); Paul Alan Forgette, Brownstown, MI (US); Ramon Bakerjian, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 79 days.

(21) Appl. No.: 16/682,232

(22) Filed: Nov. 13, 2019

(65) Prior Publication Data
US 2021/0138949 A1    May 13, 2021

(51) Int. Cl.
*B60N 3/02* (2006.01)
*B60J 7/16* (2006.01)

(52) U.S. Cl.
CPC ............. *B60N 3/02* (2013.01); *B60J 7/1628* (2013.01)

(58) Field of Classification Search
CPC . B60J 7/1268; B60J 7/1635; B60J 7/11; B60J 7/1628; B60N 3/02; B60N 3/026
USPC ................................................. 296/1.02, 214
See application file for complete search history.

(56) References Cited

U.S. PATENT DOCUMENTS

| | | | |
|---|---|---|---|
| 6,685,257 B1 * | 2/2004 | Beland | B60N 3/026 280/728.1 |
| 8,113,397 B2 * | 2/2012 | Magnusson | F16B 37/045 224/324 |
| 9,302,568 B2 * | 4/2016 | Kim | B60J 3/0208 |
| 9,751,459 B1 * | 9/2017 | Lenz, Jr. | B60Q 1/2657 |
| 2002/0113465 A1 * | 8/2002 | Inari | B60N 3/023 296/214 |
| 2005/0092801 A1 | 5/2005 | Hicks et al. | |
| 2018/0345476 A1 * | 12/2018 | Carnevali | A47B 95/02 |
| 2019/0283681 A1 * | 9/2019 | Forgette | B60R 9/048 |
| 2019/0283682 A1 * | 9/2019 | Marchlewski | B60R 9/058 |
| 2019/0329638 A1 * | 10/2019 | Willard | B60J 7/194 |

FOREIGN PATENT DOCUMENTS

| | | | | |
|---|---|---|---|---|
| CN | 106740350 A | * | 5/2017 | |
| DE | 102010033398 A1 | * | 2/2012 | ............... B60Q 3/43 |
| DE | 102016015397 A1 | | 6/2018 | |
| JP | 2001150960 A | | 6/2001 | |

\* cited by examiner

*Primary Examiner* — Jason S Morrow
*Assistant Examiner* — Kevin P Weldon
(74) *Attorney, Agent, or Firm* — David Coppiellie; Price Heneveld LLP

(57) ABSTRACT

A grab handle assembly for a vehicle includes first and second anchoring features coupled to a vehicle surface. A rail extends between the first and second anchoring features in a spaced relationship with the vehicle surface. A slot is defined by the rail and configured to receive a key feature for attachment of the key feature to the rail.

19 Claims, 6 Drawing Sheets

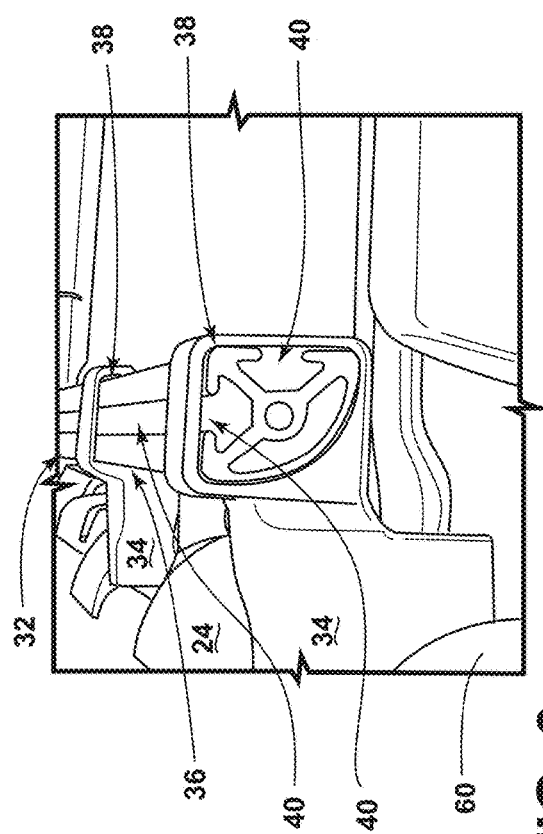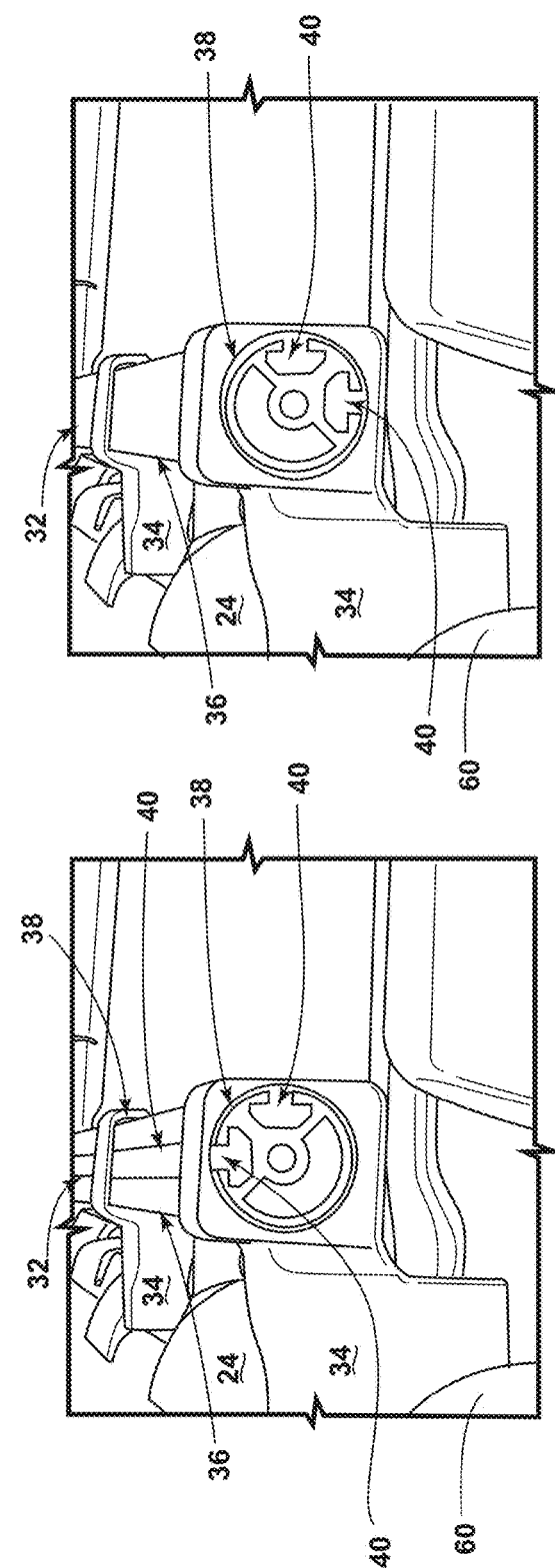

GRAB HANDLE ASSEMBLY

FIELD OF THE INVENTION

The present invention generally relates to a grab handle assembly for the vehicle. In particular, the present invention generally relates to a grab handle assembly for a vehicle having a rail that defines a slot.

BACKGROUND OF THE INVENTION

Vehicles are often equipped with overhead grab handles for vehicle occupants to hold onto. Typical grab handles are often coupled to the roofs of vehicles and, therefore, are incompatible with vehicles that have removable roof panels. Further, typical grab handles are not configured to receive key features for attaching components such as cameras to the grab handles.

SUMMARY OF THE DISCLOSURE

According to a first aspect of the present disclosure, a grab handle assembly for a vehicle includes first and second anchoring features that extend outward from a vehicle surface. A rail extends between the first and second anchoring features and is in a spaced relationship with the vehicle surface. A slot may be defined by the rail and may be configured to receive a key feature for attachment of the key feature to the rail.

Embodiments of the first aspect of the invention can include any one or combination of the following features:
- a cross member that extends between first and second vehicle pillars, wherein at least a portion of the vehicle surface is a portion of the cross member;
- the rail is operable between a first position and a second position relative to the first and second anchoring features;
- the slot comprises a first slot and a second slot;
- the first slot is defined on a generally vehicle-inboard side of the rail, and the second slot is defined on a generally vehicle-upward side of the rail; and
- a third anchoring feature that extends outward from the vehicle surface, wherein the rail is configured to extend between the second and third anchoring features.

According to a second aspect of the present disclosure, a vehicle includes first and second vehicle pillars. A cross member extends between the first and second vehicle pillars. A removable roof panel is removably coupled to the cross member and is operable between an assembled condition, wherein the removable roof panel is assembled to the vehicle, and a removed condition, where the removable roof panel is not assembled to the vehicle. A grab handle assembly includes first and second anchoring features coupled to the cross member and a rail that extends between the first and second anchoring features. The rail has a slot configured to receive a key feature for attachment of the key feature to the rail.

Embodiments of the second aspect of the invention can include any one or combination of the following features:
- the grab handle assembly is coupled to the cross member when the removable roof panel is in the assembled condition and when the removable roof panel is in the removed condition;
- first and second anchoring features extend generally vehicle-upward, such that the rail is wholly vehicle upward of at least a portion of the first and second anchoring features;
- at least one of the first and second anchoring features defines an aperture configured to receive the rail;
- the rail is configured to extend through the aperture and protrude out of the aperture in the vehicle-forward direction and the vehicle-rearward direction;
- the rail is generally tubular;
- the length of the rail that extends between the first and second anchoring features is generally straight;
- the rail is operable between a first position and a second position relative to the first and second anchoring features; and
- first and second anchoring features extend outward from the cross member, such that the rail that extends between the first and second anchoring features is in a spaced relationship with the cross member.

According to a third aspect of the present disclosure, a vehicle includes at least one cross member coupled to the vehicle. A removable roof panel is removably coupled to the at least one cross member and is operable between an assembled condition, wherein the removal panel is assembled to the vehicle, and a removed condition, wherein the removable roof panel is not assembled to the vehicle. The grab handle assembly includes first, second, and third anchoring features coupled to the at least one cross member, and a rail that extends between the first, second, and third anchoring features. The rail has a slot configured to receive a key feature for attachment of the key feature to the rail.

Embodiments of the third aspect of the invention can include anyone or combination of the following features:
- an aperture defined by at least one of the first, second, and third anchoring features, wherein the rail is configured to extend through the aperture;
- the rail is operable between a first position and a second position relative to the first, second, and third anchoring features;
- the slot generally faces a first vehicle direction when the rail is in the first position and a second vehicle direction when the rail is in the second position; and
- the grab handle assembly is coupled to the at least one cross member when the removable roof panel is in the assembled condition and when the removable roof panel is in the removed condition.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 6 is an elevational view of the grab handle assembly, illustrating the rail of the grab handle assembly extending between first and second anchoring features of the grab handle assembly in a generally vehicle-longitudinal direction, according to one embodiment;

FIG. 7A is an elevational view of the grab handle assembly, illustrating the rail extending between the first and second anchoring features of the grab handle assembly while in a first position, according to one embodiment;

FIG. 7B is an elevational view of the grab handle assembly, illustrating the rail extending between the first and second anchoring features of the grab handle assembly while in a second position, according to one embodiment.

DETAILED DESCRIPTION OF THE PREFERRED EMBODIMENTS

Figure 1:
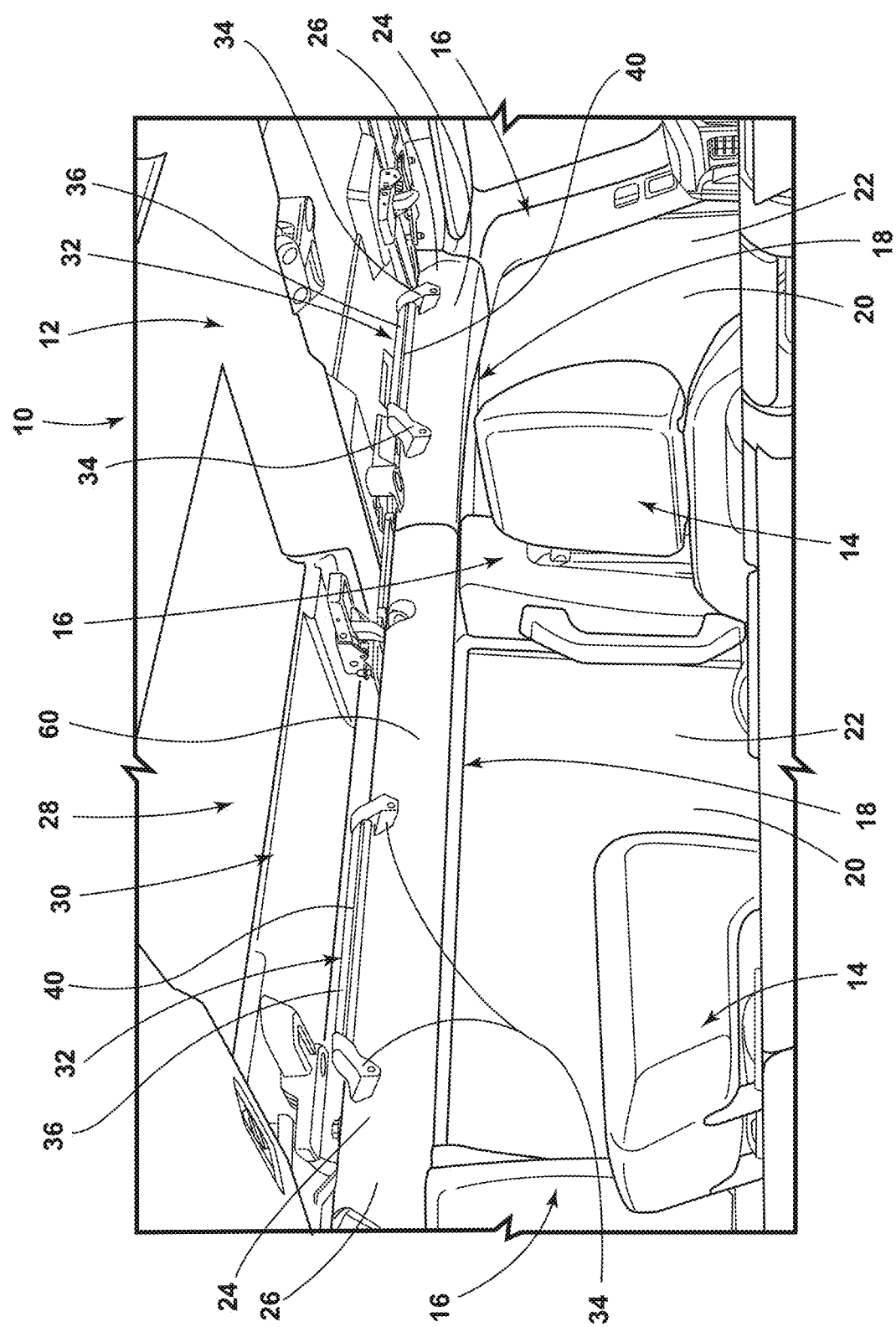
FIG. 1 is a perspective view of a vehicle interior, illustrating a grab handle assembly coupled to a cross member of the vehicle, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In reference to FIGS. 1-8, a grab handle assembly 32 for a vehicle 10 is disclosed herein.

The grab handle assembly 32 may include first and second anchoring features 34 coupled to a vehicle surface 60. A rail 36 extends between the first and second anchoring features 34 and is in a spaced relationship with the vehicle surface 60. A slot 40 may be defined by the rail 36 and may be configured to receive a key feature 50 for attachment of the key feature 50 to the rail 36.

Figure 2:
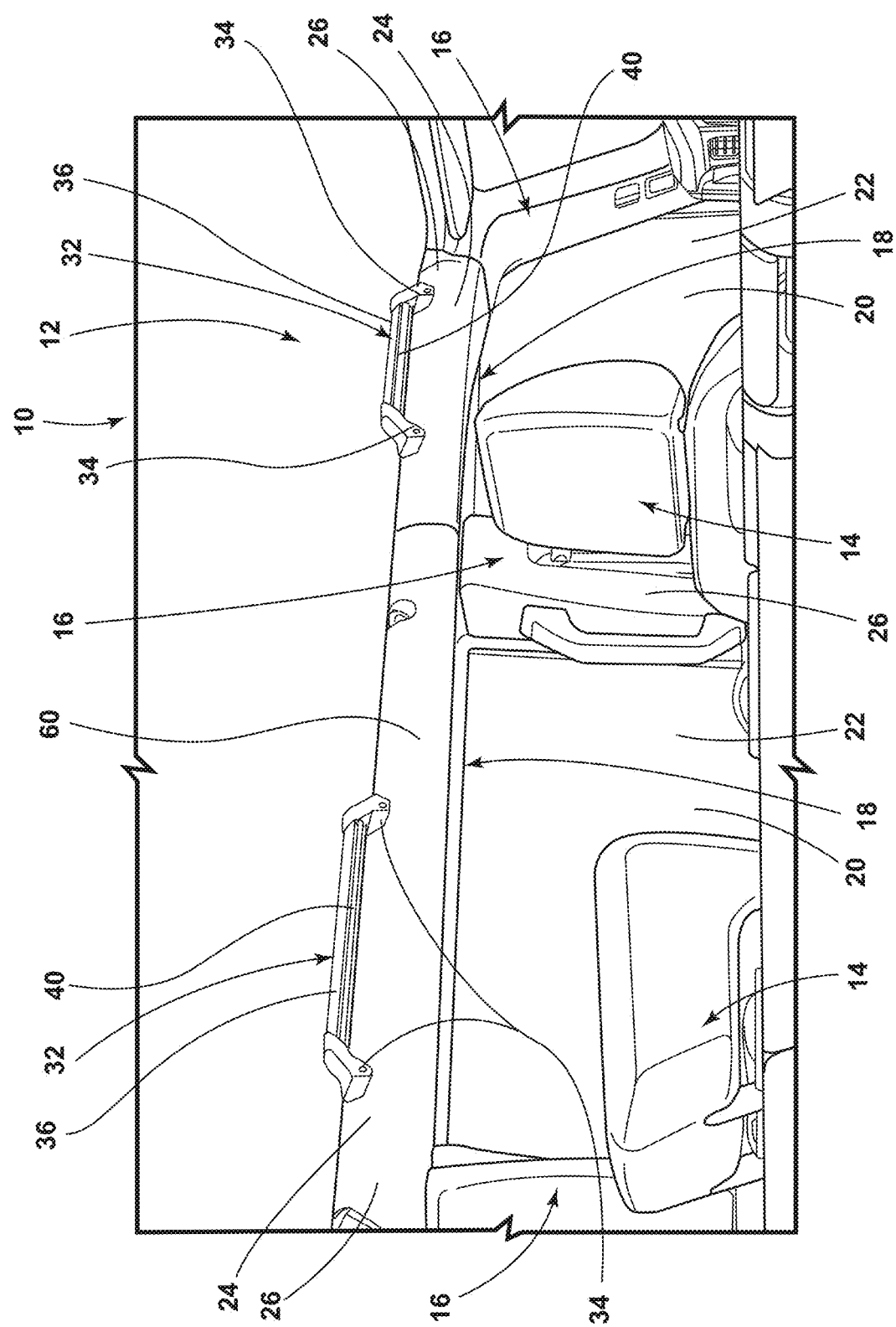
FIG. 2 is a perspective view of the vehicle interior, illustrating the vehicle with a removable roof panel in a removed condition and the grab handle assembly coupled to the cross member of the vehicle, according to one embodiment.

Referring now to FIGS. 1 and 2, the vehicle 10 includes a vehicle interior 12. The vehicle interior 12 may include one or more seating assemblies 14. The vehicle 10 may include a plurality of vehicle pillars 16. For example, in various embodiments, there may be a first vehicle pillar 16 and a second vehicle pillar 16. The vehicle 10 may include a door 18. Further, the vehicle 10 may include one or more windows 20. In some embodiments, the vehicle 10 may include one or more side windows 22. The side windows 22 may be disposed within and/or coupled to the doors 18, in some embodiments.

Referring further to FIGS. 1 and 2, in various embodiments, the vehicle 10 may include a cross member 24. The cross member 24 may be coupled to the vehicle pillars 16 and/or may extend between the vehicle pillars 16. For example, the cross member 24 may be coupled to the first and second vehicle pillars 16 and may extend therebetween. As shown in FIGS. 1 and 2, in various embodiments, the cross member 24 may be disposed generally vehicle-upward of the doors 18 and side windows 22 of the vehicle 10. In various embodiments, the vehicle 10 may include a plurality of cross members 24 extending between the plurality of vehicle pillars 16. In some embodiments, the vehicle pillars 16 and the cross members 24 may include trim panels 26, as shown in FIGS. 1 and 2.

In further reference to FIGS. 1 and 2, in various embodiments, the vehicle 10 may include a roof 28. In some embodiments, the vehicle 10 may include a removable roof panel 30. In some embodiments, the removable roof panel 30 may be coupled to the cross member 24. The removable roof panel 30 may be operable between an assembled condition, wherein the removable roof panel 30 is assembled to the vehicle as shown in FIG. 1, and a removed condition, wherein the removable roof panel 30 is not assembled to the vehicle 10, as shown in FIG. 2. It is contemplated that the removable roof panel 30 may be coupled to various portions and/or components of the vehicle 10 in addition to or in the alternative of the cross member 24 of the vehicle 10. It is further contemplated that, in various embodiments, the vehicle 10 may include a plurality of removable roof panels 30.

Figure 3:
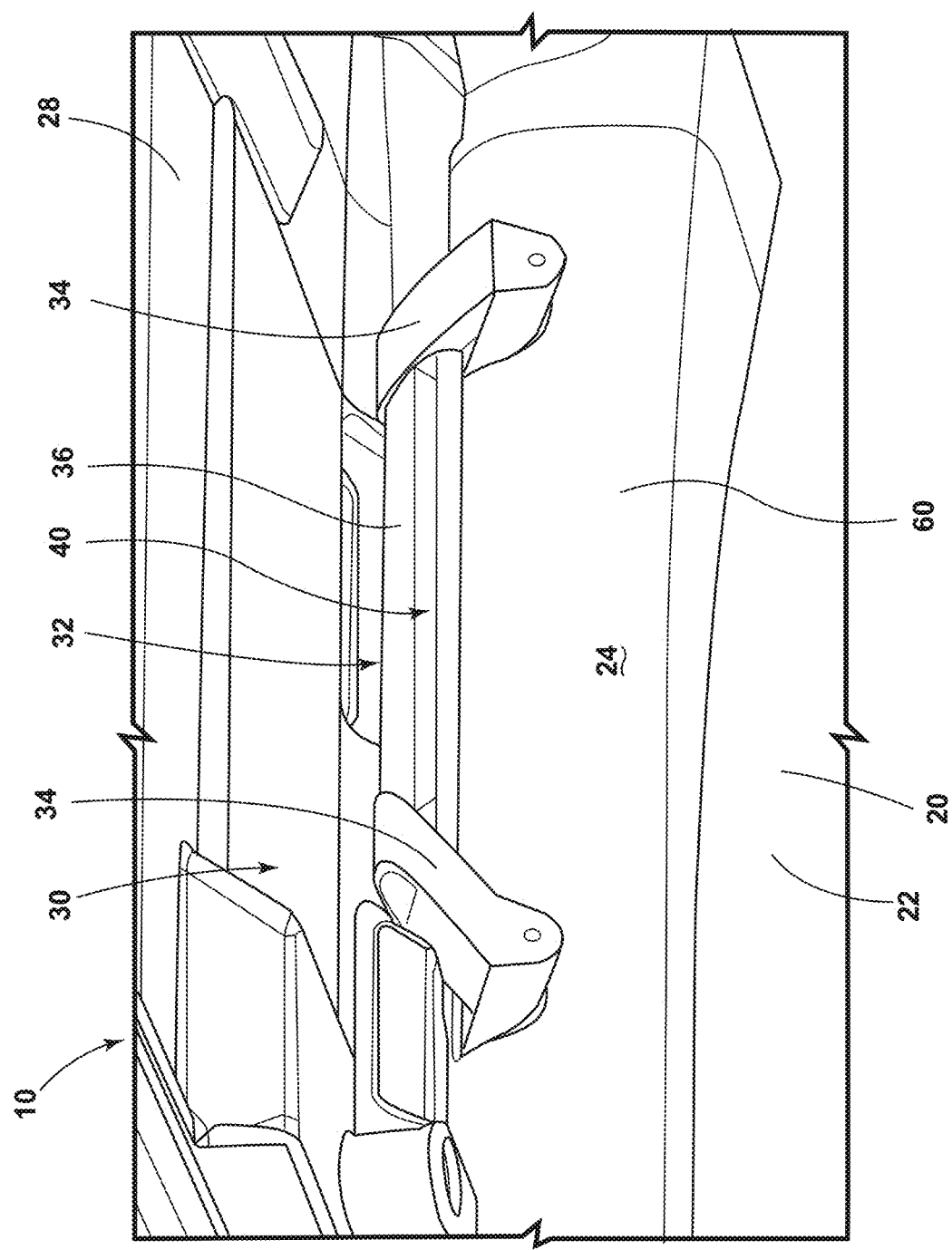
FIG. 3 is a side elevational view of the vehicle interior, illustrating the removable roof panel in an assembled condition and the grab handle assembly coupled to the cross member of the vehicle, according to one embodiment.

Referring now to FIGS. 1-3, the vehicle 10 may include the grab handle assembly 32. The grab handle assembly 32 may include a plurality of anchoring features 34 coupled to the vehicle surface 60. Further, the rail 36 may extend between the plurality of anchoring features 34 and may be configured to be grabbed by a vehicle occupant. In various embodiments, the plurality of anchoring features 34 may be coupled to various vehicle surfaces 60 and may extend outward from the vehicle surfaces 60. For example, as shown in FIGS. 1-3, the plurality of anchoring features 34 may be coupled to the cross member 24 and extend outward from the cross member 24. In some embodiments, the anchoring features 34 may be coupled to the trim panels 26 of the cross member 24. In some embodiments, the anchoring features 34 may be coupled to the roof 28, the vehicle pillars 16, the trim panels 26 of various portions of the vehicle 10, and/or various other vehicle surfaces 60. As shown in FIG. 3, first and second anchoring features 34 may be coupled to the cross member 24 of the vehicle 10. As will be discussed further below, the grab handle assembly 32 may include additional anchoring features 34 coupled to at least one of the cross members 24, as shown in FIGS. 1 and 2 (e.g., third and fourth anchoring features 34, etc.).

Referring now to FIGS. 1-3 and 6-8, in various embodiments, the anchoring features 34 may extend outward from the cross member 24 and generally vehicle-upward from the portion of the anchoring feature 34 in contact with the cross member 24. It is contemplated that, in some embodiments, the plurality of anchoring features 34 may extend in various directions outward from the vehicle surface 60. In some embodiments, the plurality of anchoring features 34 may be generally fixed relative to the vehicle surface 60 that is coupled to the plurality of anchoring features 34. For example, the plurality of anchoring features 34 may be generally fixed to the cross member 24 that the plurality of anchoring features 34 are coupled to.

Referring now to FIGS. 3-8, in various embodiments, the rail 36 may be coupled to and extend between the plurality of anchoring features 34. For example, as shown in FIG. 3, the rail 36 may extend between the first and second anchoring features 34. In some embodiments, where the first and second anchoring features 34 extend generally vehicle-upward from the cross member 24, the rail 36 may be wholly vehicle-upward of at least a portion of the first and second anchoring features 34. In some embodiments, the rail 36 may extend generally vehicle-longitudinally between the plurality of anchoring features 34. Further, in some embodiments, the rail 36 may be generally vehicle-upward of the portions of the plurality of anchoring features 34 that are in contact with the vehicle surface 60. For example, the rail 36 may be generally vehicle-upward of the portions of the plurality of anchoring features 34 that are in contact with the cross member 24, as shown in FIG. 3.

Figure 8:
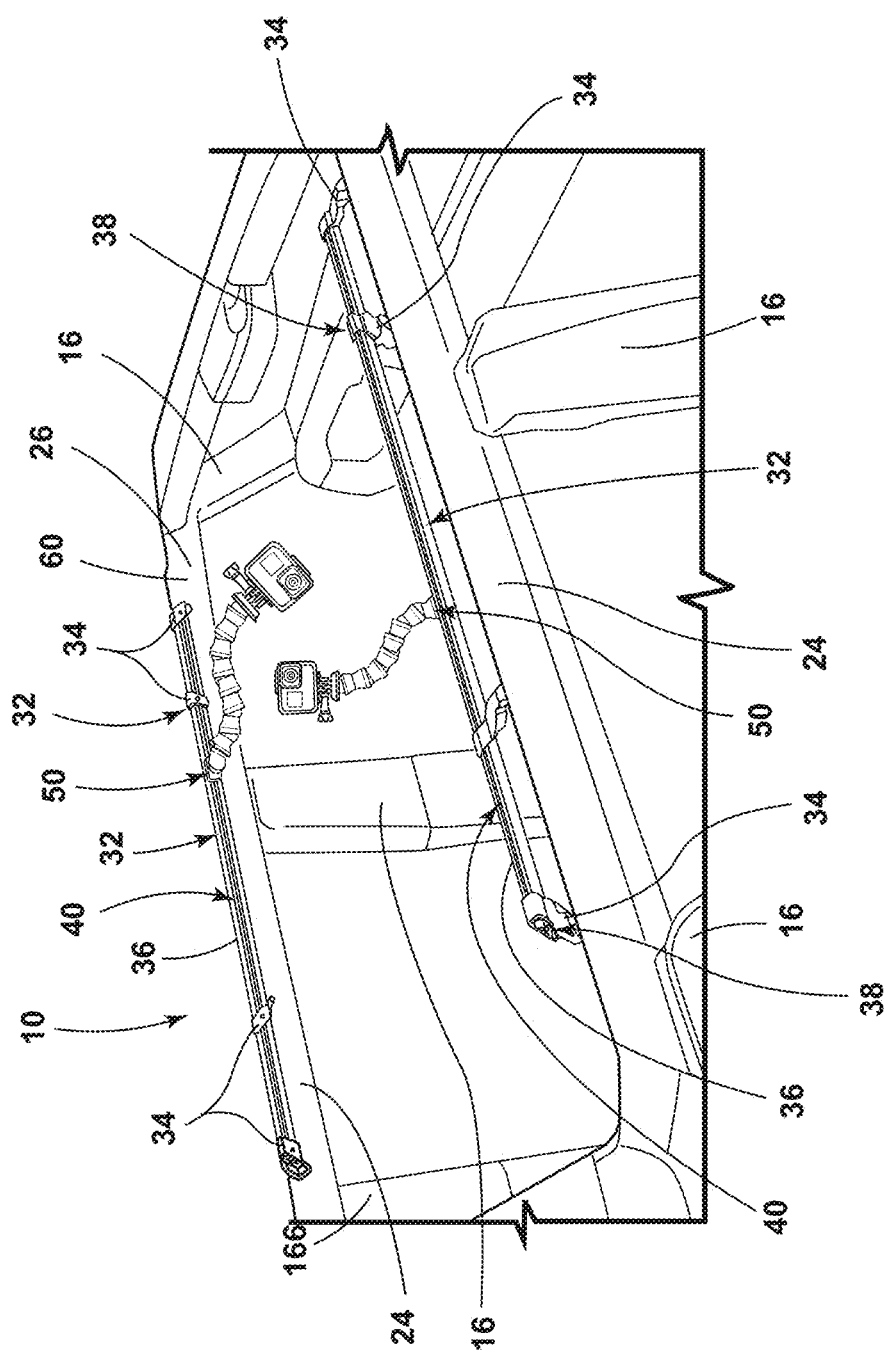
FIG. 8 is a perspective view of the vehicle, illustrating a rail extending between a plurality of the anchoring features coupled to the cross member of the vehicle and a camera coupled to the rail via the key feature engaged with the slots defined by the rail, according to one embodiment.

As shown in FIGS. 7A-8, in various embodiments, the rail 36 may be in a spaced relationship with the vehicle surface 60 that the anchoring features 34 are coupled to. In other words, the anchoring features 34 may extend outward from the vehicle surface 60, and the rail 36 may extend between the portions of the anchoring features 34 that are distanced from the vehicle surface 60, such that there is a gap between the vehicle surface 60 and the rail 36. For example, as shown in FIG. 8, the rail 36 may be in a spaced relationship with the trim panel 26 of the cross member 24 that the plurality of anchoring features 34 are coupled to. The gap between the rail 36 and the vehicle surface 60 may enable a vehicle occupant to move his or her hand between the vehicle surface 60 and the rail 36 while grabbing the rail 36. In various embodiments, the spaced relationship between the rail 36 and the vehicle surface 60 may be generally fixed while the rail 36 is coupled to and extending between the anchoring features 34. In other words, the gap between the rail 36 and the vehicle surface 60 may be generally fixed in size.

Referring now to FIGS. 3-8, in some embodiments, the rail 36 may be wholly between the ends of the plurality of anchoring features 34. For example, as shown in FIG. 3, the rail 36 may be disposed wholly vehicle-longitudinally between the vehicle-longitudinal ends of the first and second anchoring features 34. In some embodiments, the rail 36 may extend beyond the ends of at least one of the plurality of anchoring features 34, as shown in FIGS. 6-8. In various embodiments, at least one of the plurality of anchoring features 34 may include an aperture 38. The aperture 38 may be defined by the at least one of the plurality of anchoring features 34. In various embodiments, the aperture 38 may be configured to receive the rail 36. In other words, the rail 36 may be configured to extend through the aperture 38 in the at least one anchoring feature 34. In some embodiments, the rail 36 may be configured to extend through the aperture 38 and protrude out of the aperture 38 in the vehicle-forward direction and the vehicle-rearward direction, as shown in FIG. 8. As further shown in FIG. 8, the rail 36 may extend between two or more of the plurality of anchoring features 34. In some embodiments, the rail 36 may extend between first, second, and third anchoring features 34. Further, as shown in FIG. 8, in some embodiments, the rail 36 may extend between first, second, third, and fourth anchoring features 34.

Referring now to FIGS. 1-3 and 8, in some embodiments, the vehicle 10 may include rails 36 of varying sizes. For example, as shown in FIGS. 1-3, the grab handle assembly 32 of the vehicle 10 may include relatively short rails 36 that may extend between first and second anchoring features 34 of the grab handle assembly 32. As shown in FIG. 8, however, in some embodiments, the grab handle assembly 32 of the vehicle 10 may include a relatively long rail 36. The relatively long rail 36 may extend between first, second, and third anchoring features 34. Further, as shown, in some embodiments, the relatively long rail 36 may extend between first, second, third, and fourth anchoring features 34. It is contemplated that the rail 36 may extend between various numbers of anchoring features 34, in various embodiments. In some embodiments of the vehicle 10, relatively short rails 36 may be operable to extend between the first and second anchoring features 34, when the removable roof panel 30 of the vehicle 10 is in the assembled condition, as shown in FIGS. 1 and 3, while the relatively long rail 36 may be operable to extend between the first, second, third, and/or fourth anchoring features 34, when the removable roof panel 30 is in the removed condition relative to the vehicle 10, as shown in FIG. 8. Moving the removable roof panel 30 from the assembled condition to the removed condition may remove potential obstacles that would prevent the relatively long rail 36 from extending between the first, second, third, and/or fourth anchoring features 34 when the removable roof panel 30 is in the assembled condition.

Figure 5:
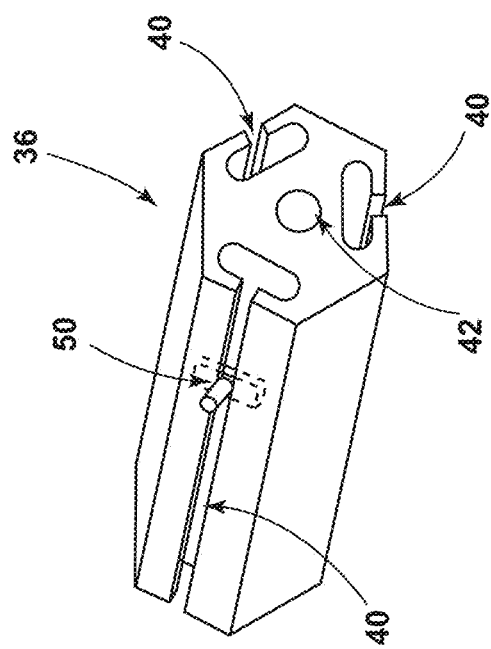
FIG. 5 is a perspective view of the rail of the grab handle assembly, illustrating the slot defined by the rail and a key feature engagement with the slot, according to one embodiment.
Figure 4:
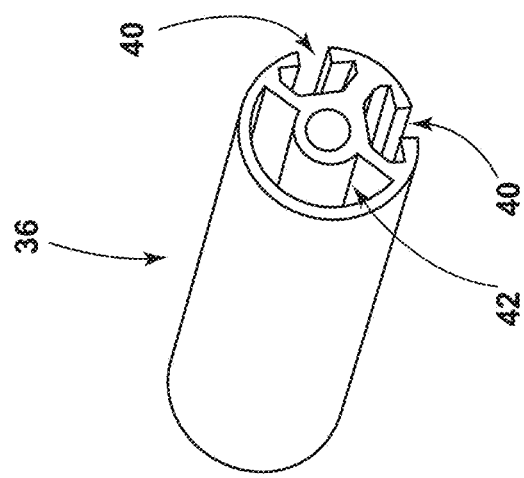
FIG. 4 is a perspective view of a rail of the grab handle assembly, illustrating slots extending along the length of the rail, according to one embodiment.

Referring now to FIGS. 4-7, the rail 36 of the grab handle assembly 32 may have various cross-sectional shapes. For example, as shown in FIG. 4, the rail 36 may have a generally round cross-section. In some embodiments, the rail 36 may have a generally hexagonal cross-section, as shown in FIG. 5. As shown in FIG. 6, in some embodiments, the rail 36 may be formed into a shape that is designed to be comfortable for a vehicle occupant's hand when the vehicle occupant is gripping the rail 36 of the grab handle assembly 32. It is contemplated that the rail 36 may have at least one of a variety of cross-sectional shapes (e.g., oval, square, octagonal, curved, etc.).

Referring further to FIGS. 4-7B, in various embodiments, the rail 36 may include a slot 40 configured to receive the key feature 50 that is configured to be attached to the rail 36. In some embodiments, the rail 36 may include a plurality of slots 40, such as a first slot 40 and a second slot 40. In various embodiments, the slot 40 may be defined by the rail 36. In some embodiments, the slot 40 may be generally elongated and extend generally along the length of the rail 36. For example, as shown in FIGS. 6-7B, the slots 40 may extend generally along the rail 36 in the vehicle longitudinal direction from the first anchoring feature 34 to the second anchoring feature 34. In this way, the slots 40 may act as guide tracks along which the key feature 50 may move between various positions along the length of the rail 36. In various embodiments, the slot 40 may be generally narrower proximate to the exterior surface of the rail 36 and may broaden as the slot 40 extends rail-inboard. For example, as shown in FIGS. 4-7B, the cross-sectional outline of the slots 40 may be generally mushroom-shaped. The slot 40 being generally narrow proximate to the exterior surface of the rail 36 before broadening as the slot 40 extends rail-inboard, may allow for the key feature 50 to be received within the slot 40 and then positioned such that the key feature 50 may be retained within the slot 40, as shown in FIG. 5. In some embodiments, one or more of the plurality of slots 40 may be configured as holes defined by the rail 36. The holes may extend generally through the rail 36. The one or more slots 40 configured as holes defined by the rail 36 may be positioned in spaced relationships relative to one another along the length of the rail 36.

Referring now to FIGS. 4 and 5, in various embodiments, the rail 36 may be generally tubular. In other words, in some embodiments, the rail 36 may be partially hollow along the length of the rail 36. For example, as shown in FIG. 4, the rail 36 may include one or more hollow chambers that extend through the length of the rail 36. In some embodiments, the rail 36 may be generally tubular due to the method utilized in forming the rail 36. For example, the rail 36 may be aluminum shaped via extrusion. As such, in various embodiments where the rail 36 is an extruded aluminum rail 36, the rail 36 may be generally tubular, as shown in FIG. 4. A generally tubular rail 36 that is at least partially hollow may be lighter than rails 36 that are not tubular, which may be beneficial for a vehicle occupant handling the rail 36. It is contemplated that the rail 36 may include one or more of a variety of materials that may include, but is not limited to, metals, natural materials, plastics, rubbers, fiber materials, and/or a combination thereof.

Referring now to FIG. 5, in various embodiments, the key feature 50 may be configured to be received by the slot 40 of the rail 36 and may be configured to be releasably engaged with the slot 40. As shown in FIG. 5, the key feature 50 may be shaped to be received within the slot 40 when positioned in a first orientation and may be configured to be retained within the slot 40 when rotated to a second orientation. It should be appreciated that the key feature 50 may be at least one of a variety of features configured for releasable engagement with slot 40 of the rail 36. In some embodiments, the key feature 50 may be a pin, a bolt, or other like feature configured to be received by, and engaged with, the slot 40 when the slot 40 defined by the rail 36 is configured as a hole in the rail 36, as discussed above. It is contemplated that various attachment components may be coupled to the key feature 50 and, thereby, may be attached to the rail 36 of the grab handle assembly 32 of the vehicle 10.

Referring now to FIGS. 7A and 7B, in various embodiments, the rail 36 may be operable between various positions. The rail 36 may be operable between various positions relative to the vehicle surface 60, in some embodiments. In some embodiments, the rail 36 may be operable between various positions relative to the cross member 24 of the vehicle 10. Further, in some embodiments, the rail 36 may be operable between various positions relative to the plurality of anchoring features 34. In various embodiments, the rail 36 may be operable to slide generally in the direction that the rail 36 extends between the plurality of anchoring features 34. For example, the rail 36 may be operable to slide vehicle-longitudinally when the rail 36 extends generally vehicle-longitudinally between the first anchoring feature 34 and the second anchoring feature 34. Sliding the rail 36 between positions relative to the plurality of anchoring features 34 may enable a vehicle occupant to exchange one or more of the relatively short rails 36 for one or more of the relatively long rails 36, as discussed above and shown exemplarily in FIG. 8. In various embodiments, the rail 36 may slide, or otherwise move, through the aperture 38 defined by the at least one anchoring feature 34.

In various embodiments, the rail 36 may be operable between various rotational positions relative to the plurality of anchoring features 34. In some embodiments, the rail 36 may be arranged relative to the plurality of anchoring features 34 in a first position, wherein the one or more slots 40 generally face first vehicle directions. For example, as shown in FIG. 7A, the first and second slots 40 depicted generally face vehicle-upward and vehicle-inboard, respectively, while the rail 36 is in the first position relative to the plurality of anchoring features 34. The rail 36 may be operable to move to a second position, wherein the one or more slots 40 depicted generally face second vehicle directions. For example, as shown in FIG. 7B, the first and second slots 40 depicted generally face vehicle-inboard and vehicle-downward, respectively, when the rail 36 is in the second position relative to the plurality of anchoring features 34. As such, in some embodiments, the slots 40 may generally face a first vehicle direction when the rail 36 is in the first position and a second vehicle direction when the rail 36 is in the second position. Rotational variance of the rail 36 in the first position relative to the rail 36 in the second position may allow the vehicle occupant to adjust the angle of the key feature 50 and any attached components that protrude outward from the rail 36.

In operation, the vehicle occupant may remove the removable roof panel 30 from the vehicle 10, such that the removable roof panel 30 shifts from the assembled condition to the removed condition. The vehicle occupant may then engage the key feature 50 with the slot 40 defined by the rail 36 extending between the plurality of anchoring features 34 of the grab handle assembly 32. In this way, a component (e.g., awning, camera, bug net, etc.) attached to the key feature 50 may be coupled to the rail 36 of the grab handle assembly 32. The vehicle occupant may adjust the position of the component attached to the rail 36 by the key feature 50 by sliding the key feature 50 along the slot 40 defined by the rail 36. The vehicle occupant may further adjust the position of the component attached to the rail 36 by adjusting the position of the rail 36 relative to the plurality of anchoring features 34.

The present disclosure may provide a variety of advantages. First, having the slot 40 defined by the rail 36 of the grab handle assembly 32 may give the grab handle assembly 32 the additional utility of allowing for convenient attachment of the key features 50 and associated components to the rail 36 of the grab handle assembly 32. Second, coupling the grab handle assembly 32 to the cross member 24 of the vehicle 10 may enable the vehicle occupant to remove the removable roof panels 30 without removing the grab handle assembly 32 from the vehicle 10. Third, aligning the apertures 38 of the plurality of anchoring features 34 with one another in the vehicle 10 may allow the vehicle occupant to exchange the relatively short rail 36 that extends between the first anchoring feature 34 and the second anchoring feature 34 with the relatively long rail 36 that extends between the first, second, third, and/or fourth anchoring features 34. Fourth, the rail 36 being operable between various positions relative to the vehicle surface 60, the cross member 24, and/or the plurality of anchoring features 34 may enable the vehicle occupant to adjust the position of the key feature 50 and components attached to the key feature 50, as desired.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A grab handle assembly for a vehicle, comprising:
   first and second anchoring features that extend outward from a vehicle surface;
   a rail that extends between the first and second anchoring features, in a spaced relationship with the vehicle surface, and being operable between first and second positions relative to the first and second anchoring features; and
   a slot defined by the rail and configured to receive a key feature for attachment of the key feature to the rail, wherein the slot faces a first vehicle direction in the first position of the rail, and the slot faces a second vehicle direction in the second position of the rail.

2. The grab handle assembly of claim 1, further comprising:
   a cross member that extends between first and second vehicle pillars, wherein at least a portion of the vehicle surface is a portion of the cross member.

3. The grab handle assembly of claim 1, wherein the slot is a first slot of the rail and the rail further comprises:
   a second slot.

4. The grab handle assembly of claim 3, wherein the first slot is defined on a generally vehicle-inboard side of the rail, and the second slot is defined on a generally vehicle-upward side of the rail.

5. The grab handle assembly of claim 1, further comprising:
   a third anchoring feature that extends outward from the vehicle surface, wherein the rail is configured to extend between the second and third anchoring features.

6. A vehicle, comprising:
   first and second vehicle pillars;
   a cross member that extends between the first and second vehicle pillars;
   a removable roof panel removably coupled to the cross member and operable between an assembled condition, wherein the removable roof panel is assembled to the vehicle, and a removed condition, wherein the removable roof panel is not assembled to the vehicle; and
   a grab handle assembly, comprising:
      first and second anchoring features coupled to the cross member; and
      a rail that extends between the first and second anchoring features, the rail having a slot configured to receive a key feature for attachment of the key feature to the rail.

7. The vehicle of claim 6, wherein the grab handle assembly is coupled to the cross member when the removable roof panel is in the assembled condition and when the removable roof panel is in the removed condition.

8. The vehicle of claim 6, wherein the first and second anchoring features extend generally vehicle upward, such that the rail is wholly vehicle-upward of at least a portion of the first and second anchoring features.

9. The vehicle of claim 6, wherein at least one of the first and second anchoring features defines an aperture configured to receive the rail.

10. The vehicle of claim 9, wherein the rail is configured to extend through the aperture and protrude out of the aperture in the vehicle-forward direction and the vehicle-rearward direction.

11. The vehicle of claim 6, wherein the rail is generally tubular.

12. The vehicle of claim 6, wherein a length of the rail that extends between the first and second anchoring features is generally straight.

13. The vehicle of claim 12, wherein the rail is operable between a first position and a second position relative to the first and second anchoring features.

14. The vehicle of claim 6, wherein the first and second anchoring features extend outward from the cross member, such that the rail that extends between the first and second anchoring features is in a spaced relationship with the cross member.

15. A vehicle, comprising:
   at least one cross member coupled to the vehicle;
   a removable roof panel removably coupled to the at least one cross member and operable between an assembled condition, wherein the removable roof panel is assembled to the vehicle, and a removed condition, wherein the removable roof panel is not assembled to the vehicle; and
   a grab handle assembly, comprising:
      first, second, and third anchoring features coupled to the at least one cross member; and
      a rail that extends between the first, second, and third anchoring features, the rail having a slot configured to receive a key feature for attachment of the key feature to the rail.

16. The vehicle of claim 15, further comprising:
   an aperture defined by at least one of the first, second, and third anchoring features, wherein the rail is configured to extend through the aperture.

17. The vehicle of claim 16, wherein the rail is operable between a first position and a second position relative to the first, second, and third anchoring features.

18. The vehicle of claim 17, wherein the slot generally faces a first vehicle direction when the rail is in the first position and a second vehicle direction when the rail is in the second position.

19. The vehicle of claim 15, wherein the grab handle assembly is coupled to the at least one cross member when the removable roof panel is in the assembled condition and when the removable roof panel is in the removed condition.

* * * * *